(12) United States Patent
Amitay et al.

(10) Patent No.: US 7,540,419 B2
(45) Date of Patent: Jun. 2, 2009

(54) PERSONAL INDEX OF ITEMS IN PHYSICAL PROXIMITY TO A USER

(75) Inventors: Einat Amitay, Shimshit (IL); Aya Soffer, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 353 days.

(21) Appl. No.: 10/675,155

(22) Filed: Sep. 30, 2003

(65) Prior Publication Data

US 2005/0067492 A1    Mar. 31, 2005

(51) Int. Cl.
G06F 19/00 (2006.01)
G06Q 30/00 (2006.01)
G09Q 90/00 (2006.01)

(52) U.S. Cl. .................. 235/385; 235/375; 235/383
(58) Field of Classification Search ............ 235/385, 235/375, 380, 472, 487, 383; 705/28, 20–22
See application file for complete search history.

(56) References Cited

U.S. PATENT DOCUMENTS

| | | | |
|---|---|---|---|
| 4,851,815 A | | 7/1989 | Enkelmann |
| 5,552,588 A * | | 9/1996 | Schneider .................. 235/385 |
| 6,195,006 B1 | | 2/2001 | Bowers et al. |
| 6,199,034 B1 * | | 3/2001 | Wical ............................ 704/9 |
| 6,388,569 B1 * | | 5/2002 | Engellenner ................ 340/505 |
| 6,438,447 B1 | | 8/2002 | Belka et al. |
| 6,484,933 B1 | | 11/2002 | Zimmerman et al. |
| 6,844,821 B2 * | | 1/2005 | Swartzel et al. .......... 340/691.6 |
| 2002/0185532 A1 * | | 12/2002 | Berquist et al. ............. 235/385 |
| 2003/0004999 A1 * | | 1/2003 | Walker et al. ............... 707/513 |
| 2003/0024975 A1 * | | 2/2003 | Rajasekharan .............. 235/375 |
| 2003/0155413 A1 * | | 8/2003 | Kovesdi et al. .............. 235/375 |
| 2003/0216969 A1 * | | 11/2003 | Bauer et al. .................... 705/22 |
| 2003/0227392 A1 * | | 12/2003 | Ebert et al. ............ 340/825.49 |
| 2004/0044658 A1 * | | 3/2004 | Crabtree et al. ................ 707/3 |
| 2004/0078750 A1 * | | 4/2004 | Frank .......................... 715/500 |

OTHER PUBLICATIONS

*Modern Information Retrieval* by Ricardo Baeza-Yates, Copyright © 1999 by Addison-Wesley Publishing, ISBN: 020139829X.
Tomasic, Anthony et al., "Incremental Updates of Inverted Lists for Text Document Retrieval," published in International Conference on Management of Data and Symposium on Principles of Database Systems, Proceedings of the 1994 ACM SIGMOD International Conference on Management of Data 1994, Minneapolis, Minnesota, USA.

* cited by examiner

Primary Examiner—Edwyn Labaze

(57) ABSTRACT

A dynamic index may list physical items in the changing vicinity of a user or a generator of the index. The vicinity may be within the same space as the user or the generator, such as a store, a library, a shelf, an aisle, within a given radius, a street, a city, a campus, a building, an area and a park. The index may store information about the physical items near the user or generator, such as content found on tags associated with the physical items. The content might be a description of the physical items and their locations. The present invention also includes a system and method to generate such a dynamic index.

14 Claims, 5 Drawing Sheets

PERSONAL INDEX OF ITEMS IN PHYSICAL PROXIMITY TO A USER

FIELD OF THE INVENTION

The present invention relates to indices generally and to personal indices in particular.

BACKGROUND OF THE INVENTION

Technologies exist that catalog physical items into a computerized index. For example, libraries have computerized catalog systems. U.S. Pat. No. 6,195,006 to Bowers et al. describes one such library system which places tags on the books, periodicals, etc. of the library's collection. As described in the abstract of U.S. Pat. No. 6,195,006, each tag has a unique identification or serial number for identifying the individual article. An inventory database tracks all of the tagged articles and maintains circulation status information for each article. Articles are checked out of the library using a patron self-checkout system. Checked out articles are returned to the library via patron self-check in devices. The shelves are periodically scanned with a mobile RFID scanner for updating inventory status.

U.S. Pat. No. 6,438,447 describes another inventory tracking and control system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
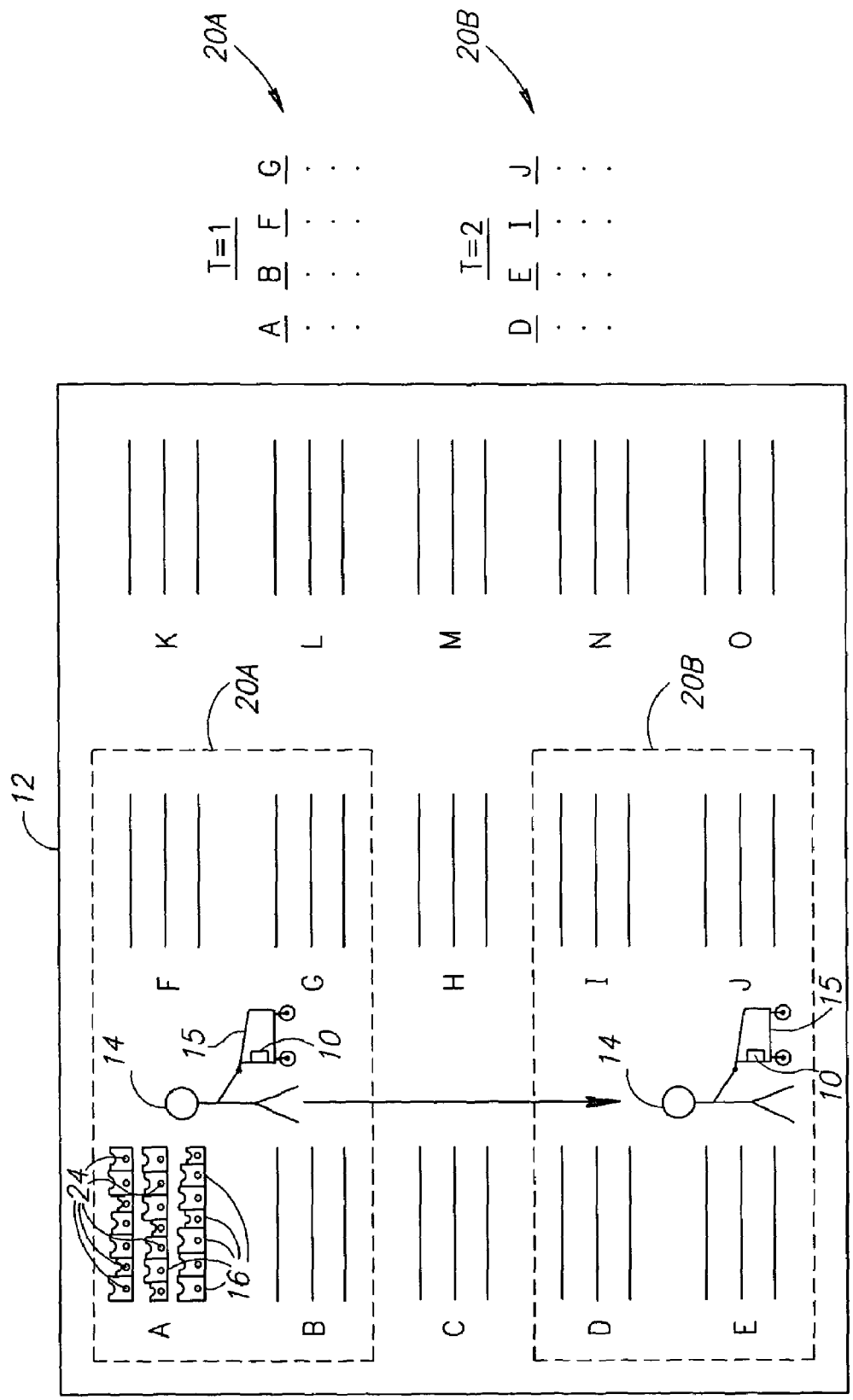
FIG. 1 is a schematic illustration of a personal index generator, constructed and operative in accordance with the present invention, and a physical space through which a person, wearing personal index generator, moves.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that there are technologies available in the virtual world, such as search, browse, and recommenders, which may be very useful in the physical context. This context may include places where there are many objects to be looked through—such as supermarkets, libraries, department stores, a large household, etc. A user may want to find a particular object (e.g. "Where are my brown shoes?" or "What shelf is the coffee on?") or the supermarket may want to recommend an item which is stored near where the consumer is standing ("On your left, you will find coffee on sale."). The present invention is a system which may provide such functionality.

Reference is now made to FIG. 1, which illustrates a personal or location-based index generator 10, constructed and operative in accordance with the present invention, and a physical space 12 through which a person 14 moves. In the example of FIG. 1, physical space 12 may be a store or a library and generator 10 may be mounted on a cart 15 that person 14 may push through physical space 12.

In accordance with a preferred embodiment of the present invention, personal index generator 10 may generate a personal index (or database) of items 16 in physical proximity to person 14. Any definition of "proximity" may be included, such as, within 5 feet, in the same aisle, on the same floor, in the same building, in the same city, etc. but the frame of reference for proximity may be the current location of person 14.

FIG. 1 shows person 14 in physical space 12 at two different times, T=1 and T=2. At time T=1, person 14 is shown near shelves A, B, F and G while at time T=2, person 14 is shown near shelves D, E, I and J. In this example, the definition of proximity is "within a few feet" and thus, personal index generator 10 may generate a personal index 20A of items 16 on shelves A, B, F and G at time T=1 and a different personal index 20B for time T=2 of items 16 on shelves D, E, I and J.

In accordance with a preferred embodiment of the present invention, personal indices 20 may be of any suitable index type and may be fully searchable. For example, each personal index 20 may be a searchable index of descriptive terms and may be searchable with a natural language query as is known in the art, particularly in Web search engines.

Moreover, index 20 may be an index of the content found on and/or transmitted from each object to the personal index 20. It also may include an indication about the physical location of the object as well as other information that the object may be carrying. Thus, when person 14 may want to find out what items may be on the nearby shelves, person 14 may query the current personal index 20. Alternatively or in addition, person 14 may query current personal index 20 for the location of a desired item, which may or may not be nearby.

Personal index generator 10 may generate personal indices 20 in any suitable manner. They may gather the information from items 16 themselves or they may operate on a space-wide index (not shown) listing all of the items 16 in physical space 12.

In one embodiment, items 16 may have tags 24 capable of transmitting an identifying signal, such as tags or cell phones, and generator 10 may have a receiver capable of decoding such signals. Tags 24 may continually transmit such signals (e.g. for tracking object movement) or may only do so in the presence of a querying signal (e.g. when objects are not moveable or that their movement is irrelevant, insignificant or not important). When person 14 may come with generator 10 in the proximity of items 16, generator 10 may either decode the signals from the items within the pre-defined proximity or it may transmit a querying signal, after which it may decode the received signals. Generator 10 may then generate current personal index 20 from the received identifying information.

In another embodiment, generator 10 may query the space-wide index for items that are within the pre-defined proximity of person 14 and may produce current personal index 20 from the results.

Tags 24 may include mechanisms to determine their location, such as global positioning system (GPS) sensors or transceivers capable of communicating with smartshelves, such as those manufactured by The Gillette Company, described in the article found at: news.com/2100-1017-979710.html. Tags 24 may communicate with these shelves to determine on which shelf the item 16 to which they are attached may be located. Alternatively, tags 24 may include mechanisms to receive inputted data listing the location within the store where they are to be placed. Tags 24 may include the location information in the identifying information transmitted to generator 10.

Alternatively, personal index generator 10 may have the capability to determine the location of the signals it receives, such as by triangulation, as is known in the art. This does not usually provide the location of an item by the shelf it is on, but by the distance and direction of the item from person 14.

Personal index generator 10 may be utilized in any physical space whose items are tagged. For example, generator 10 may be utilized to look in a supermarket for a grocery item from a shopping list, to look for a perfume in a department store, a book in a library, a CD in a music-store, a well loved T-shirt in a messy wardrobe, etc. In each case, generator 10 may generate an index of the items "nearby" for person 14 to search, either from the tags themselves or from the space-wide index, where the physical space to be explored may be defined in any suitable manner, such as the entire store or library or one department thereof, or one floor thereof. In another embodiment, the physical space may be a region in a city if using a cell phone or another device with such remote capabilities.

Figure 2:
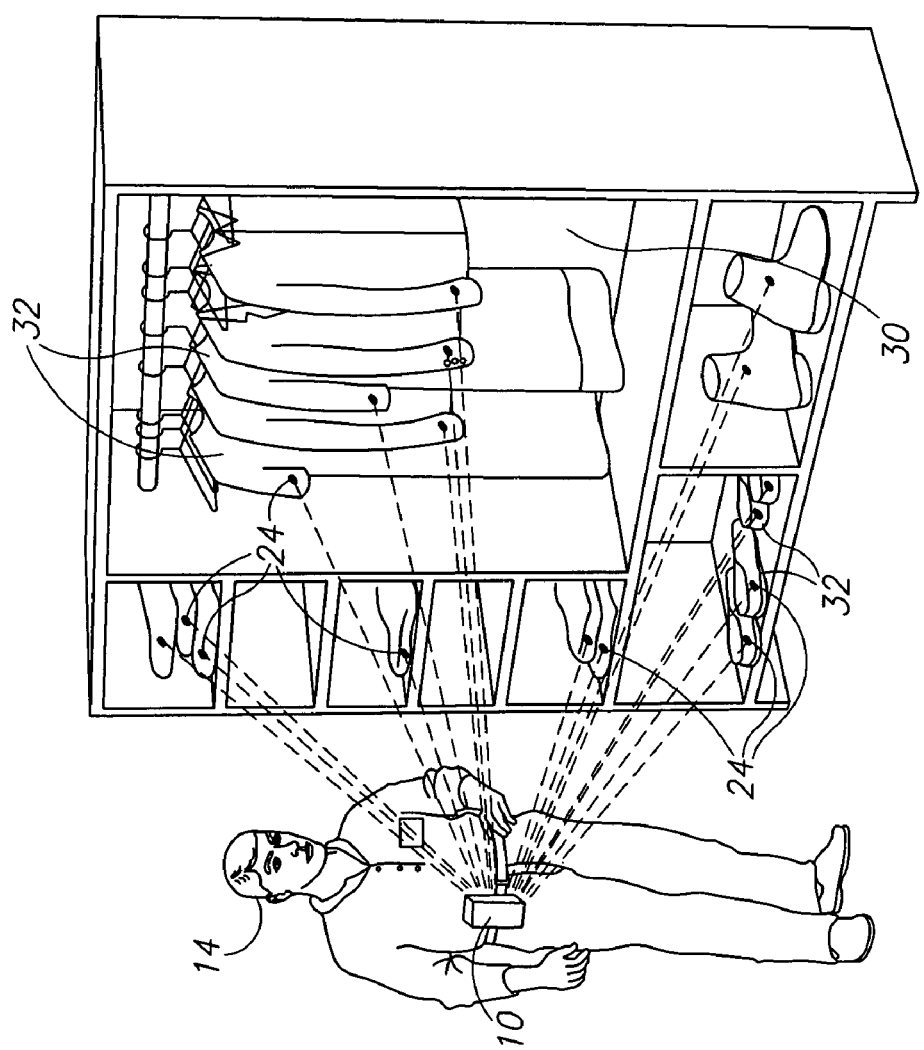
FIG. 2 is a schematic illustration of the generator of FIG. 1 within the physical space of a wardrobe.

Reference is now made to FIG. 2, which illustrates an exemplary embodiment of a wardrobe 30. Similar reference numerals may refer to similar items. In this embodiment, person 14 may be wearing personal index generator 10.

The clothing 32 in wardrobe 30 may have tags 24 attached thereto which may transmit identifying information to generator 10 which, in turn, may produce an index 34 of the items currently in wardrobe 30. For example, index 34 may list the dresses, jackets and shoes stored in wardrobe 30, with separate identifiers for each one. FIG. 2 shows some simple identifiers, such as "dress 1" and "jacket 1"; these are exemplary only. More specific identifiers may be used, such as "Ralph Lauren T-shirt, teal blue".

Person 14 may query generator 31 to search for a desired item of clothing. For example, person 14 may ask "Has my yellow shirt returned from the laundry?"

It will be appreciated that indices 20 and 34 may list the items in the vicinity of index generator 10, which may or may not be the vicinity of person 14. When person 14 may be wearing generator 10, then the vicinity of index generator 10 and that of person 14 may be the same and thus, the generated index may be a personal index. The same is true when generator 14 may be found close to person 14, such as mounted on a shopping cart that person 14 may be pushing or holding, or mounted on a car in which person 14 may drive, or mounted on any other device with which person 14 may currently be associated. However, when person 14 may no longer be associated with the moving device, generator 14 may still operate. In this case, the generated index may be only a location-based index. For the purposes of the following discussion, the generated index will be called a "personal" index, as the device may be substantially similar for both personal and location-based indices. It will be appreciated that the present invention covers both types of indices, mutatis, mutandis.

In another embodiment of the present invention, each object may "contain" information that is either changeable/editable on the object itself or at the central database. For example, person 14 may have a car to which a tag is attached. Person 14 may decide to sell the car and may edit the information in the tag to "advertise" the fact that s/he wants to sell the car. This information may remain in the tag or may be transmitted with all the information the car tag holds to a central "street" database. The car may then appear as a result whenever someone wanting to buy such a car passes in the general vicinity, such as on the same street or in the same neighborhood. For example, it may appear as a result of a query "Ford 1998 for sale".

Figure 3:
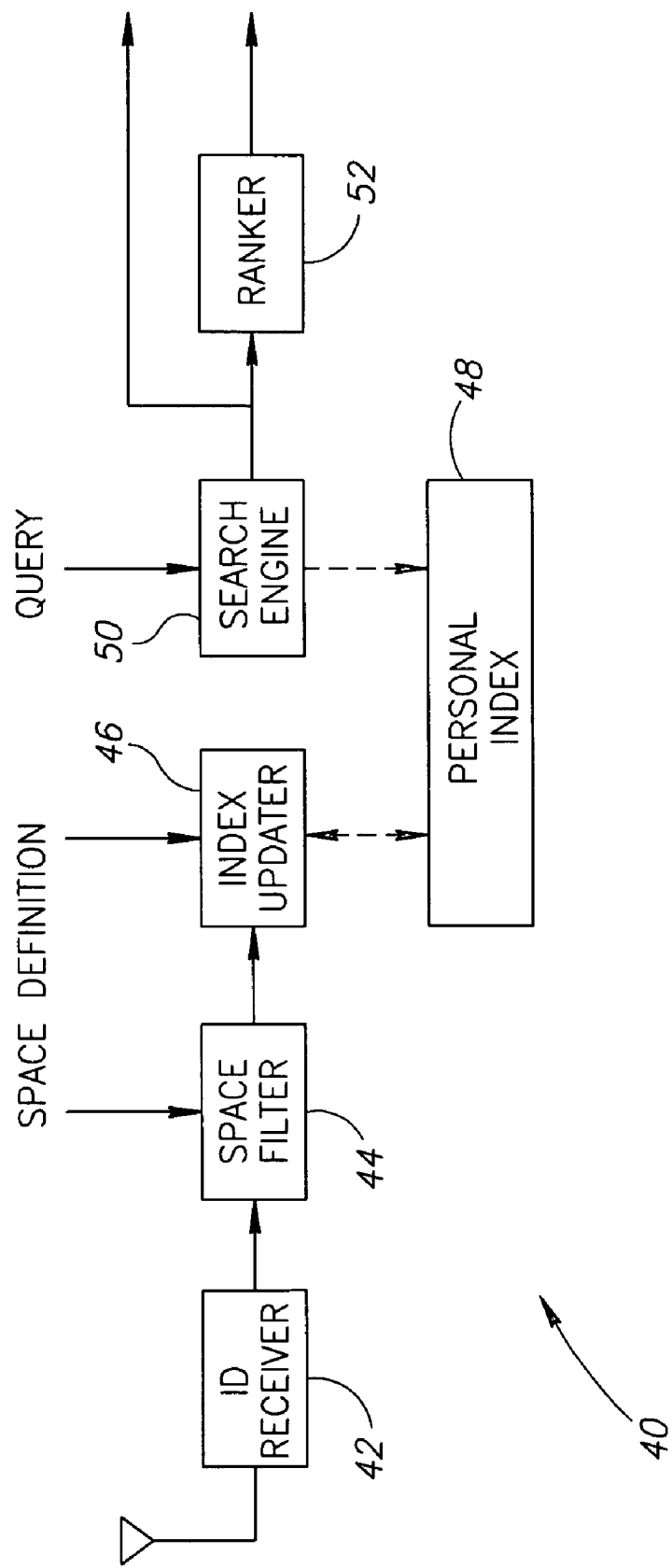
FIG. 3 is a block diagram illustration of a first exemplary embodiment of personal index generator.

Reference is now made to FIG. 3, which illustrates a first exemplary embodiment of personal index generator, herein labeled 40, in which generator 40 may receive information directly from tags 24. In this embodiment, generator 40 may comprise an ID receiver 42, a space filter 44, an index updater 46, a personal index 48, a searcher 50 and a ranker 52.

ID receiver 42 may be any device which may receive and decode signals from a tag 24. For example, if tag 24 is an RFID tag, then ID receiver 42 may be an RFID receiver. Alternatively, if tag 24 is a cell phone, then receiver 42 may be a cell phone receiver.

The signals may contain information describing the item having tag 24, such as the type of item, its manufacturer, its price and its location within its space. Other information, such as may be received from an owner of the item may also be included.

Space filter 44 may receive a space definition from person 14 defining the space whose items person 14 may desire to list in personal index 48. Any definition of "space" may be suitable, such as "within 5 feet", in the same store, on the same floor, in the same closet, in the same city, etc.

Space filter 44 may review the signals coming from ID receiver 42 and may pass only those whose location information matches that of the space definition. For example, an RFID signal may indicate that an item is located in SOME STORE on Arlington Street, Boston. Space filter 44 may pass this signal on only if the space definition is a) Boston, b) Arlington Street, Boston or c) SOME STORE, Arlington Street, Boston. It will not pass this signal if the space definition is A DIFFERENT STORE, Arlington Street, Boston.

Space filter 44 may also review the signal strength of the received signals, in order to determine which items transmitting signals are "close" to person 14 or generator 40. Space filter 44 may pass this information on to index updater 46.

Index updater 46 may take the information that passes through space filter 44 and may add the information to personal index 48. Alternatively or in addition, updater 46 may update a record for any item whose tag has previously transmitted its information.

Periodically, index updater 46 may review the items listed in personal index 48 to ensure that each item is within the space defined by the current space definition and may remove any items not within the currently defined space, or whose current signal strength is lower than a predetermined threshold.

At any time, person 14 may enter a query into search engine 50 and search engine 50 may review personal index 48 accordingly. Ranker 52 may review the output of search engine 50 and may rank the results according to proximity to person 14 or according to any other ranking scheme.

There are many forms of indexing, one of which personal index 48 may use. For example, data may be indexed by their categories, their click through ratings (e.g. traffic analysis), how many times they are cited ("citations"), and how popular they are or any combination of the above. Search engine 50 may search the data and ranker 52 may rank the data according to how it is indexed in index 48. The book *Modern Information Retrieval*, by Ricardo Baeza-Yates and Berthier Ribeiro-Neto, ACM Press Series/Addison Wesley, N.Y., May 1999, discusses index types and the processes to operate with them. The present invention incorporates all types of indices and the units which operate with them.

Figure 4:
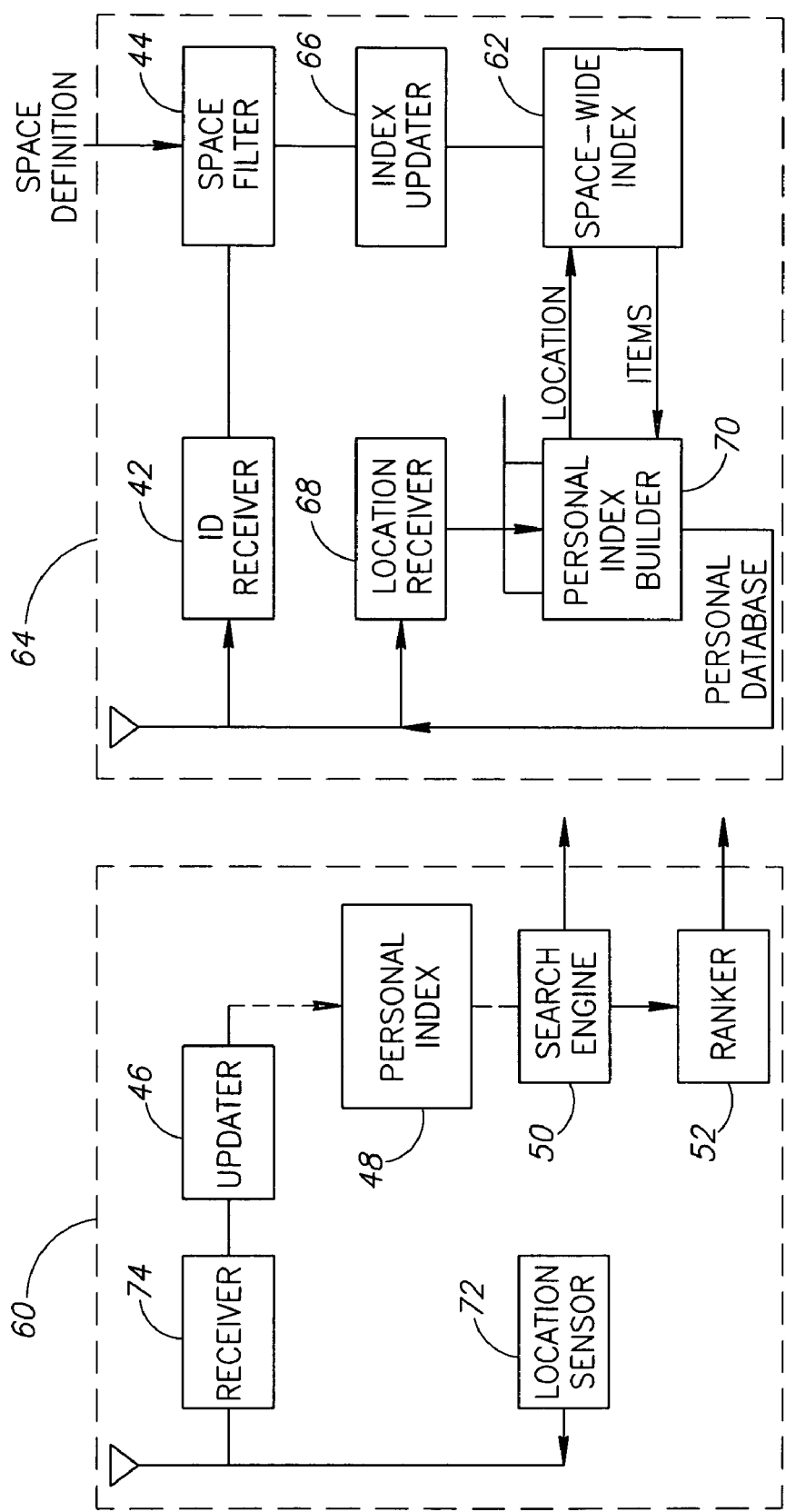
FIG. 4 is a block diagram illustration of a second exemplary embodiment of personal index generator.

Reference is now made to FIG. 4, which illustrates a further embodiment of the personal index generator, here labeled 60, operating in conjunction with a space wide index 62. Some items of FIG. 4 may be similar to those of FIG. 3 and may carry similar reference numerals.

In this embodiment, useful in spaces, such as stores and/or libraries, which have their own indices of their inventory (e.g. space-wide index 62), generator 60 may produce personal index 48 from the existing data.

The existing data may be gathered in any suitable manner, but should be updated regularly in order for personal index 48 to be useful. For example, space-wide index 62 may be part of a space-wide server 64 which may update space-wide index 62 and may provide data to the personal indices 48 of persons 14 moving about physical space 12.

Space-wide server 64 may comprise ID receiver 42, space filter 44, an index updater 66, a location receiver 68 and one or more personal index builders 70. ID receiver 42 may operate as above, but may operate to receive signals from the tags 24 on the multiplicity of items 16 in physical space 12, irrespective of the locations of persons 14. ID receiver 42 may receive the signals in any suitable manner, such as by scanning, by transmitting query impulses, etc. such that only a few items 16 may transmit their identification information at a time.

The identification information may be any suitable information. It may include location information, such as within the store or library, on a given floor, on a particular aisle and on a particular shelf in the aisle. The information may be transmitted as is or may be transmitted as a key or pointer to information already stored in space-wide index 62.

ID receiver 42 may provide the received information to space filter 44 which may filter out any signals not belonging to items within physical space 12 (i.e. not within the store). Index updater 66 may update space-wide index 62 with the received information. The updating may occur whenever ID receiver 42 may receive a signal, or it may occur in batches, such as only once the store or library may be closed for business.

Index updater 66 may perform an incremental index update which may allow for changing the information found about each item/document once in a while without updating the entire index. To do so, index updater 66 may generate incremental indices which may be searched, together with the main index, when given a search request. Periodically, such as when the system may be "left to rest" after working hours or overnight, index updater 66 may generate a new, full, main updated index. The book, Modern Information Retrieval discusses incremental updating. In addition, an exemplary updating process is described in "Incremental Updates of Inverted Lists for Text Document Retrieval" published in *International Conference on Management of Data and Symposium on Principles of Database Systems, Proceedings of the* 1994 *ACM SIGMOD International Conference on Management of Data* 1994, Minneapolis, Minn., United States.

During store hours, location receiver 68 may receive location indications from the personal index generators 60 of the persons 14 moving about the store. Location receiver 68 may provide the received locations to personal index builders 70 which may build personal indices of items near the received location. Each builder 70 may review the data of space-wide index 62 and may compare the location of each item with the received location of person 14. Personal index builder 70 may then store information about only those items which may be determined to be nearby to person 14. At an appropriate time, builder 70 may transmit the resultant index. Alternatively, builder 70 may transmit the information about each item as builder 70 may find the item.

Generator 60 may comprise personal index 48, index updater 46, search engine 50 and ranker 52 from the previous embodiment, which elements may operate as described hereinabove. Generator 60 may additionally comprise a location sensor 72 and a data receiver 74.

Data receiver 74 may receive the information transmitted by builder 70 and may provide such to index updater 46. Updater 46 may update personal index 48 with the received information in any suitable manner. It will be appreciated that, in this embodiment, space-wide server 64 may find the items of the personal index and generator 60 may enter them into personal index 48. Search engine 50 and ranker 52 may operate on personal index 48 as in the previous embodiment.

Location sensor 72 may be any suitable device which may sense the location of person 14. For example, it may be tied to a cell phone system and may provide location information in a manner similar to that found by cell phones.

Alternatively (not shown), location sensor 72 may be part of physical space 12 and may be connected to space-wide server 64, rather than as part of generator 60. In the latter embodiment, location sensor 72 may be an optical reader over an aisle, a video camera, an infra-red detector, an RF reader, etc, and generator 60 may include a matching tag which may be sensed by location sensor 72.

Figure 5:
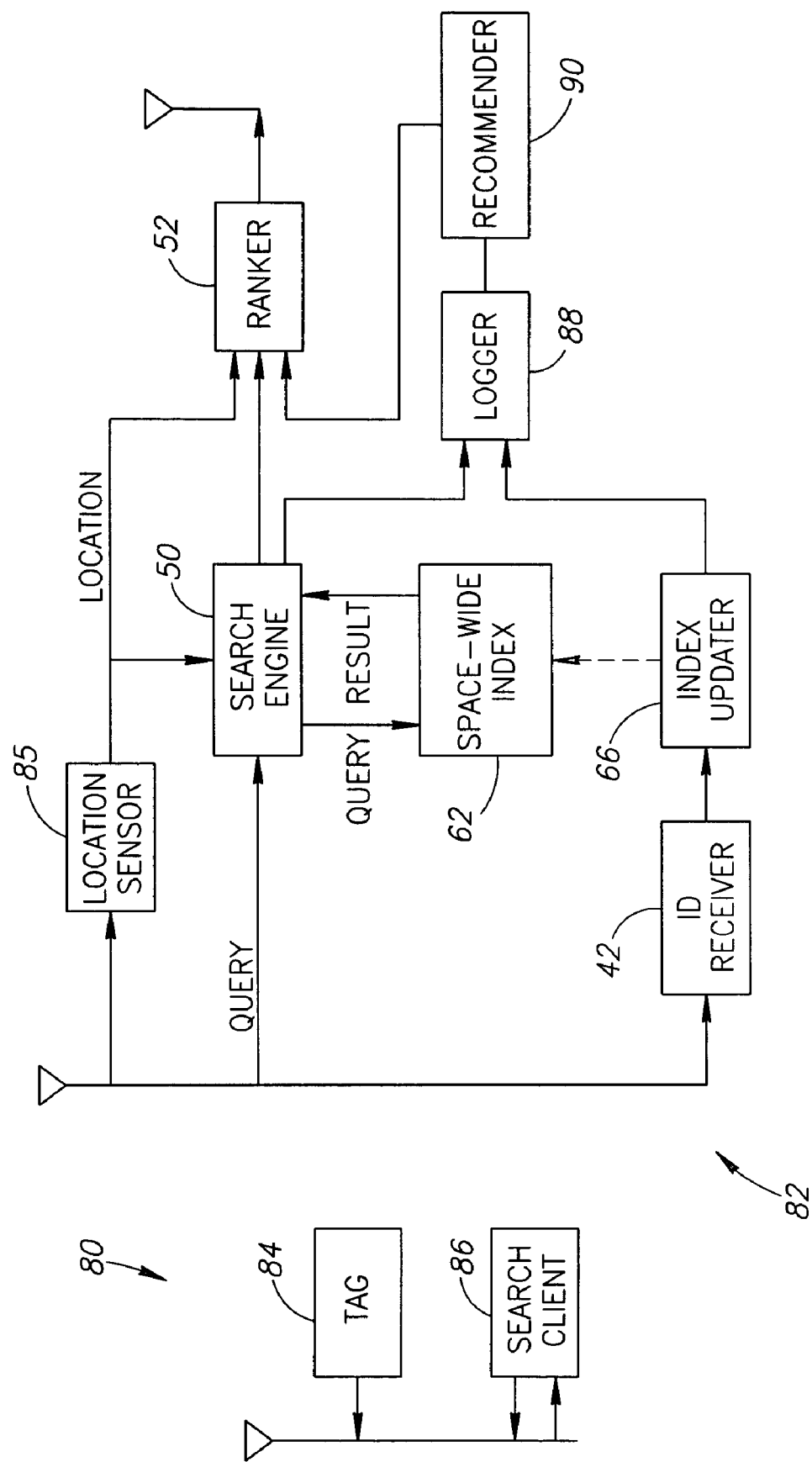
FIG. 5 is a block diagram illustration of a third exemplary embodiment of personal index generator.

In another embodiment, shown in FIG. 5 to which reference is now made, person 14 may carry a personal searcher 80 which may communicate with a space-wide server, here labeled 82. Some items of FIG. 5 may be similar to those of previous embodiments and may carry similar reference numerals.

Personal searcher 80 may comprise an identifying tag 84 and a search client 86. Identifying tag 84 may be any suitable tag, such as an RFID tag, able to identify person 14 carrying client 80. Search client 86 may be any suitable client able to define searches, provide queries to space-wide index 62 and display results to person 14.

Space-wide server 82 may comprise ID receiver 42, index updater 66, space-wide index 62, search engine 50 and ranker 52. These items may operate as described hereinabove; search engine 50 and ranker 52 here operate on space-wide index 62.

In addition, server 82 may comprise a location sensor 85, a logger 88 and a recommender 90. Location sensor 85 may be any element located in physical space 12 which may sense identifying tag 84 as person 14 may pass by. Location sensor 85 may thus identify the location of person 14 and may provide this information to search engine 50 or to ranker 52.

Search engine 50 may receive a query from search client 86, may search space-wide index 62 and may generate a result. Search engine 50 may search using the query itself or may add the location information from location sensor 85 to the query.

Search engine 50 may provide the result (or results) to ranker 52 which may, in turn, rank the results according to any appropriate measure or measures. If search engine 50 does not use the location information, then the initial ranking may be according the location of person 14 (as provided by location sensor 85). Ranker 52 may also utilize the output of recommender 90 to either affect the rankings or to add recommendations to the highest ranked items.

Logger 88 may log information about the movement of items 16 and may analyze this information. For example, logger 88 may log each placement and relocation of an item 16 Logger 88 may monitor items 16 for frequency of use, age in the system, history of searches where this item was chosen as a relevant result, etc. Based on information which logger 88 may collect, it may be possible to recommend items in physical space 12 to others. Recommender 90 may recommend items according to any suitable recommendation technique. The operation of logger 88 may be similar to that found in other inventory systems on the World Wide Web, such as that at Amazon.com.

Recommender 90 may utilize the logged information of logger 88 and may be able to suggest various things to persons 14 and to the owners of the store. To persons 14, recommender 90 may suggest other items of interest, other, matching/complementary items to those already looked at, and other paths in physical space 12 that would help person 14 navigate it better and may produce a list of optional items to browse. To the owners of the store, recommender 90 may suggest efficient advertisement spaces, better arrangements of items 16 in physical space 12 for enhancement of profits/benefits/use, and the acquisition of items that may be listed in space-wide index 62 but may not be currently available in physical space 12.

It will be appreciated that the present invention incorporates various scenarios. For example, if physical space 12 is a store, then the defined blocks of space may be the store, the floors (if more than one), the aisles and the shelves. Each item 16 may be tagged with a tag and may transmit information or an information key. The location of person 14 may be traced with smart shelves, cell phone, or may be detected with an optical reader over the aisle, a video camera, infra-red detectors, or RF readers that detect when person 14 may pass through.

In the scenario of a house, the defined blocks of space may be the house, the floors, the rooms, the cabinets, etc. Each item, such as clothing items, jewelry, video tapes, DVD, shoe, etc., may have a tag or a similar transmitter. Person 14 may be located via smart furniture (similar to smart shelves), volume sensors, movement detectors, video camera, an optical detector at the entrance to every room, etc.

In the scenario of city streets, the defined blocks of space may be the city, its streets, parks, houses, neighborhoods, suburbs, etc. all defined by a pre-computed map of the city with coordinates assigned to every fixed point in the real world. Movable objects, such as cars, bikes, lawn mowers, things that may be stolen, such as boxes stored in garages, chairs, etc., may be tagged. Person 14 may be located via GPS, cell phone tracking, a house may "declare" whether an object is found/not found in it, etc.

It will be appreciated that the present invention may provide person 14 with the ability to search for items in his/her vicinity. The various index generators described hereinabove may have some or all of the following capabilities:

a) indices may include an indication of placement of items and/or people (users may be represented by cars, cell phones, GPSs, etc.);

b) indices may be created with respect to the location of the searcher;

c) indices may be defined by physical space;

d) indices may be created on a personal-basis or retrieved and created from a central server;

e) personalization/recommendation may be performed, based on a single query transaction or on a history log of several sessions, on placement of objects or users; on user recordable actions such as buying objects, etc.; and f) the indices may be used to find objects with a natural language query While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising: receiving RF signals from RFID tags on physical items in a vicinity around a changeable current location of a user, said signals containing information only about said physical items; dynamically updating an index as the user changes location to contain said information about the physical items only in a current vicinity around a generator of said changeable current location of a user of said index; said generator is at least one of a mobile device; and searching said index to answer natural language queries from a user about said physical items in said current vicinity of said user.

2. A method according to claim 1 and wherein said user is in a space, said vicinity is within said space and said space is one of the following: a store, a library, a shelf, an aisle, within a given radius, a street, a city, a campus, a building, an area and a park.

3. A method according to claim 1 and wherein said updating comprises listing information about said physical items, wherein said information comprises content found on tags associated with said physical items.

4. A method according to claim 3 and wherein said information comprises a description of said physical items and their locations.

5. A method comprising: receiving RF signals from RFID tags on physical items in a vicinity, said signals containing information only about said physical items; dynamically updating an index to contain said information only about the physical items in said vicinity around a generator of said index; said generator is at least one of a mobile device; and searching said index to answer natural language queries from a user about said physical items.

6. A method according to claim 5 and wherein a user is in a space, said vicinity is within said space and said space is one of the following: a store, a library, a shelf, an aisle, within a given radius, a street, a city, a campus, a building, an area and a park.

7. A method according to claim 6 and wherein said indexing comprises updating said index with information from items only within said changeable space.

8. A method according to claim 6 and also comprising sensing the location of said generator.

9. A method according to claim 5 and wherein said updating comprises listing information about said physical items, wherein said information comprises content found on tags associated with said physical items.

10. A method according to claim 9 and wherein said information comprises a description of said physical items and their locations.

11. A method comprising: wirelessly gathering information from RFID tags on physical items in a vicinity around a changeable current location of a user; dynamically updating an index to contain only said information from a generator in said vicinity as said user moves; said generator is at least one of a mobile device; and searching said index to answer natural language queries from said user about said physical items.

12. A method according to claim 11 and wherein said user is in a space, said vicinity is within said space and said space is one of the following: a store, a library, a shelf, an aisle, within a given radius, a street, a city, a campus, a building, an area and a park.

13. A method according to claim 11 and wherein said information comprises content found on tags associated with said physical items.

14. A method according to claim 11 and wherein said information comprises a description of said physical items and their locations.

* * * * *